United States Patent [19]

Bier

[11] Patent Number: 4,792,357

[45] Date of Patent: Dec. 20, 1988

[54] PAINT

[76] Inventor: Kurt E. G. Bier, 63, Randersgade, 2100 Copenhagen, Denmark

[21] Appl. No.: 120,191

[22] Filed: Oct. 22, 1987

Related U.S. Application Data

[63] Continuation of Ser. No. 760,726, Jul. 22, 1985, abandoned.

[30] Foreign Application Priority Data

Nov. 21, 1984 [WO] PCT Int'l Appl. .................. PCT/DK84/00111
Nov. 22, 1983 [WO] PCT Int'l Appl. .................. PCT/DK83/00110

[51] Int. Cl.$^4$ .......................... C08L 91/00; C08L 1/08
[52] U.S. Cl. ........................................ 106/83; 106/84; 106/137; 106/148; 106/194; 106/208; 106/209; 106/214; 106/178; 524/405; 524/417; 524/418; 524/423; 524/429; 524/444
[58] Field of Search ................... 106/83, 84, 178, 214, 106/194, 208, 306, 137, 148; 524/405, 417, 418, 423, 444, 429

[56] References Cited

U.S. PATENT DOCUMENTS

| | | | |
|---|---|---|---|
| 2,648,646 | 8/1954 | Stanton et al. ....................... | 524/429 |
| 2,689,235 | 9/1954 | Henson et al. ......................... | 524/25 |
| 2,883,350 | 4/1959 | Baudecroux ......................... | 524/32 |
| 3,119,706 | 1/1964 | Bachmann ............................ | 106/309 |
| 3,357,930 | 12/1967 | Marks et al. ........................ | 252/500 |

*Primary Examiner*—Theodore Morris
*Attorney, Agent, or Firm*—Franklin D. Wolffe; Morris Fidelman

[57] ABSTRACT

A water-based paint which comprises a constituent selected from fillers and pigments as well as an aqueous phase comprising one or more water-soluble salts in an amount sufficient to substantially prevent dissolution in the paint of water-soluble organic or inorganic colored substances. The water-soluble salt/salts may be present in a concentration of at or above 10% (weight/volume), in particular at or above 35%, such as up to 70% (weight/volume). The paint is useful for the painting of stained interior building surfaces without allowing water-soluble stains to seep through the wet paint.

14 Claims, No Drawings

PAINT

This application is a continuation of application Ser. No. 760,726, filed July 22, 1985, now abandoned.

FIELD OF THE INVENTION

The present invention relates to novel water-based paints for interior use, in particular on ceilings.

DESCRIPTION OF THE PRIOR ART

The painting of interior building surfaces, such as ceilings, containing stains, is a problem due to the fact that stains, such as those caused by for instance smoke or water damage, generally contain water-soluble coloured substances.

The effective covering of such a surface by painting has so far only been possible in three ways:

The first possibility is to use a water-based paint in two or more successive layers until the water-soluble stains do not seep through the paint anymore.

The second possibility is to employ a paint based on petroleum spirit or another solvent system, such as an alkyd resin paint or the like, which does not transmit water-soluble stains. Such a paint will generally cover the first time it is applied.

The third possibility is to wash the surface with special detergents in order to remove the stains, followed by painting with either a water-based paint or a solvent-based paint.

The first possibility may be several times more expensive than the second possibility due to the extra paint consumption and the extra work involved and is thus undesirable, although it is in accordance with the legislation in several countries where it is compulsory to use the least hazardous product.

The second possibility, i.e. the use of petroleum spirit- or solvent-based paint, is undesirable from the point of view of occupational hygiene. Petroleum spirit, along with a number of other organic solvents, presents a health hazard even by moderate exposure, and is a known cause of irreparable brain damage among building painters. It is estimated that, in some countries, approximately 60% of all occupationally caused brain damages have their origin in alkyd resin paints for ceilings, thus representing by far the greatest danger of exposure for professional building painters.

The third possibility is slow and expensive with respect to manpower, and is therefore not preferable either.

SUMMARY OF THE INVENTION

The present invention obviates the above-mentioned disadvantages of the paints of the prior art.

The invention relates to a water-based paint comprising a constituent selected from fillers and pigments as well as an aqueous phase comprising one or more water-soluble salts in an amount sufficient to substantially prevent dissolution in the paint of water-soluble organic or inorganic coloured substances.

The water-soluble salts preferably comprise:
(a) a cation selected from lithium, sodium, potassium, magnesium, calcium, aluminium, zinc, iron and ammonium ions; and
(b) an anion selected from sulphate, hydrogen sulphate, sulphite, hydrogen sulphite, thiosulphate, hydrogen thiosulphate, halogen, phosphate, hydrogen phosphate, dihydrogen phosphate, nitrate, nitrite, carbonate, hydrogen carbonate, aluminate, thiocyanate, and borate ions, and ions of $C_{1-4}$ alkanoic acids optionally substituted with one or more hydroxy groups, $C_{2-4}$ dialkanoic acids optionally substituted with one or more hydroxy groups, citric acid, and benzoic acid.

DETAILED DESCRIPTION OF THE INVENTION

The paint of the invention does not allow water-soluble stains to seep through, probably as a result of a salting out effect. This effect is believed to depend partly upon the volume of water displaced by the salts in question and partly upon the specific forces that determine the interactions between the coloured substances and the electrolytes.

The paint of the invention may also contain organic water-soluble compounds such as urea.

As examples of $C_{1-4}$ alkanoic acids optionally substituted with one or more hydroxy groups may be mentioned formic acid, acetic acid, propionic acid, butyric acid, lactic acid and hydroxybutyric acid. As examples of $C_{2-4}$ dialkanoic acids optionally substituted with one or more hydroxy groups may be mentioned oxalic acid, malonic acid, succinic acid, malic acid, and tartaric acid.

Examples of water-soluble salts which may be used in the paint of the invention are:
Aluminium ammonium sulphate
Aluminium chloride, hydrated
Aluminium sulphate
Ammonium benzoate
Ammonium bromide
Ammonium carbonate
Ammonium chloride
Ammonium persulphate
Ammonium phosphate, dibasic
Ammonium phosphate, monobasic
Ammonium sulphate
Ammonium sulphite
Ammonium thiocyanate
Calcium bromide
Calcium chloride
Calcium nitride
Ferrous sulphate
Magnesium bromide
Magnesium chloride
Magnesium sulphate
Potassium acetate
Potassium benzoate
Potassium bicarbonate
Potassium bromide
Potassium carbonate
Potassium chloride
Potassium citrate
Potassium iodide
Potassium nitrite
Potassium oxalate
Potassium sodium tartrate
Potassium sulphate
Sodium acetate
Sodium ammonium sulphate
Sodium benzoate
Sodium bicarbonate
Sodium bisulphate
Sodium bromide
Sodium carbonate
Sodium chloride Sodium citrate
Sodium nitrite
Sodium phosphate, dibasic
Sodium phosphate, tribasic
Sodium sulphate
Sodium sulphate, hydrated
Sodium sulphite, anhydrous
Sodium thiocyanate
Sodium thiosulphate
Zinc acetate
Zinc chloride
Zinc iodide
Zinc sulphate For reasons of advantageous solubility characteristics and of availability, it is preferred that the water-soluble salts comprise a cation selected from lithium, sodium potassium, magnesium, zinc, aluminium and ammonium ions, preferably sodium, potassium, magnesium, zinc and ammonium ions, and an anion selected from sulphate, thiosulphate, halogen such as chloride, bromide and iodide, and phosphate ions, most preferably thiosulphate, sulphate and chloride ions.

Examples of particularly preferred water-soluble salts are sodium thiosulphate, potassium thiosulphate, ammonium thiosulphate, sodium chloride, potassium chloride, ammonium sulphate, zinc sulphate, and magnesium sulphate.

To improve the humidity resistance of the paint it is preferred that the water-soluble salt have a critical relative humidity of above 80%, in particular above 85%. For this reason, zinc sulphate is especially preferred and may give paints that can be used even in humid rooms provided it is not subjected to direct spraying of water. Such paints are usually flexible and less prone to cracking.

It is generally preferred that the concentration of the water-soluble salt/salts be at or above 5% (weight/volume) in the aqueous phase, preferably at or above 10%, in particular at or above 25%, more particularly at or above 35%, especially at or above 50%, such as up to 70% (weight/volume) in the aqueous phase.

In order to further improve the ability of the paint to prevent water-soluble stains (such as coloured "wood sugars", iron salts, etc.) from penetrating, the paint may also contain saccharides such as sucrose, glucose, lactose, fructose, invert sugar, galactose, arabinose, ribose, maltose, mannose, sorbose, dextrose, raffinose; polyhydric alcohols such as glycerol, mannitol, sorbitol, dulcitol etc.; or polysaccharides such as methyl cellulose, hydroxymethyl cellulose, ethyl cellulose, hydroxyethyl cellulose, alginic acid, sodium alginate, calcium alginate, dextrin, glycogen, agarose, pectic acid, dextran (molecular weight approx. 6,000–20,000) etc. Such additives may be present in the paint in an amount of up to 20% by weight of the paint, preferably 1–10% by weight, in particular about 5% by weight.

The fillers or pigments used in the water-based paint of the invention may be any of the fillers or pigments conventionally used in water-based paints, for example chalk, dolomite, perlite, talc, kaolin, mica, gypsum, feldspar, calcite, titanium dioxide, zinc dioxide, etc. Such fillers may be used in amounts of up to 20%, in some cases such as chalk up to 70% by weight of the paint. For the preparation of coloured paints, any of the conventional coloured pigments used in the formulation of coloured water-based paints may be used. The particle size of the filler and/or pigment may vary according to the water-soluble salt used and the optimum void volume of the paint, which factors influence the resulting opacity of the dried paint layer. In general, the average particle size may be from 0.5 $\mu$m to 10 $\mu$m.

As the paints of the invention presumably dry with the formation of a continuous crystalline layer of the water-soluble salt/salts in question and with fillers and/or pigments dispersed therein, the paint may further contain reinforcing fibres in order to improve the strength of the paint layer. The reinforcing fibres may be polymer fibres such as fibres made from polyethylene, polypropylene, polyesters, polyacrylates, polyvinyl chloride, polyamide, polyacrylonitrile etc., or mineral fibres such as diabas fibres or glass fibres, etc. The fibres may have a length of between 2 and 10 mm and may be used in amounts of up to 5% by weight of the paint.

Since the binding qualities of the dried crystalline salt layer are moderate, the paint of the invention may further contain binders. Such binders may be either water-soluble or water-dispersible.

The water-soluble binders may be cellulose derivatives such as cellulose ether ("Klucel"), ethyl hydroxyethylcellulose, ethyl methylcellulose, hydroxyethylcellulose, hydroxyethyl methylcellulose, hydroxypropyl methylcellulose, methylcellulose, sodium carboxymethylcellulose, sodium carboxymethyl hydroxyethylcellulose, or sodium cellulose sulfate; acrylates such as polyacrylic acid salts, polyacrylamide, acrylamide copolymers; carboxyvinyl polymer ("Carbopol"); polyethylene glycols; polyethylene oxide; polyvinyl alcohol; polyvinyl methyl ether; polyvinylpyrrolidone; exudates from vegetation such as gum arabic, gum karaya, gum tragacanth; seed extractives such as guar gum, locust bean gum, starch, starch derivatives, proteins (soy); seaweed products such as agar-agar, alginates, Irish moss; animal products such as casein and gelatin; tamarind gum; xanthan gum; gum ghatti; or water-soluble silicates such as potassium, sodium or lithium silicates. Such binders may be used in amounts of up to 20% by weight of the paint, preferably 3–20% by weight.

The water-dispersible binders may be any of the water-dispersible binders conventionally used in the manufacture of water-based paints. Examples thereof are drying oils such as wood oil, treated fish oil, linseed stand oil, blown linseed oil, isomerized linseed oil, urethane linseed oil, cyclopentadiene-linseed oil adducts, rapeseed oil, tall oil, etc; resins such as shellac, maleic resins, dispersible alkyd resins, tall oil alkyd resins, cottonseed alkydes, phenol resins, urea resins, epoxide resins, melamin resins, etc; polymer dispersions such as polyvinyl acetate and polyvinyl propionate dispersions, acrylic and metacrylic resin dispersions and copolymers thereof, polystyrene dispersions, etc. Such binders may be used in amounts of up to 30% by weight of the paint. When using drying oils as binders, the drying thereof may be accelerated by addition of driers such as salts, e.g. octoates or naphtanates, of metals such as Pb, Zr, Co, Mn, Fe or Cu. Such driers may be added in amounts of between 0.5 and 3% by weight of the drying oil. When using resins or polymers as binders, it may be useful to add minor amounts of various solvents in order to facilitate the bonding between the binder particles and the fillers and/or pigments. Examples of such solvents are petroleum spirit, ester alcohols and glycols. Such solvents may be added in amounts of up to 2% by weight of paint.

In order to improve the ability of the dried paint to withstand high humidity, the paint may further contain additives that renders the surface of the dried paint hydrophobic to a certain extent. Examples of such hydrophobizing agents are silicone oils and resins, fluorinated silicones, wax emulsions and polyethylene dispersions. The hydrophobizing agents will help to prevent water absorption after drying, and make it easier to paint on top of the paint layer. These agents may be used in an amount of up to 15% by weight of the paint.

The viscosity of the paint of the invention may increase with increasing content of solids, both dissolved and undissolved, and the paint may therefore further contain viscosity-reducing agents such as sugars, e.g. saccharose, glucose, dextrose or invert sugar. If appropriate, the paint may also contain thixotropic agents such as colloid silica, or thickening agents such as montmorillonite. The colloidal silica may for example be of the type sold under the trademark "Aerosil®" (from Degussa, BRD) or "HDK" (from Wacker Chemie, BRD). The viscosity-modifying agents may be added in amounts of up to 5% by weight of the paint.

In order to improve the stability of the paint, the paint may further contain surface-active agents such as emulsifiers or dispersing agents, for example lecithin, alkyl sulphates, alkyl sulphonates, polyoxyethylene surfactants, etc. Such surface-active agents may added in amounts of up to 2% by weight of paint.

In order to avoid a glossy finish on the dried paint and to provide the paint with a matte finish instead, the paint may contain a suspension of hydrophobic or hydrophilic solids such as fatty alcohols (e.g. cetyl alcohol), phosphoglycerides (e.g. lecithine), glycerides, fatty acids, paraffins, waxes or mixtures thereof. These components may be dispersed into the heated paint as a hot melt.

In order to prevent bubbles in the dried paint layer, which may be a result of painting with e.g. a roll, the paint may further contain anti-foaming agents such as anti-foam silicones or fatty alcohols, e.g. octanol or decanol. Such anti-foaming agents may be added in amounts of up to 0.5% by weight of paint.

In order to reduce the possibility of formation of salt crystals in and on the surface of the dried paint, the paint may further contain additives that substantially impede crystal formation such as for example potassium hexacyanoferrate, potassium ferricyanide, potassium cyanate, potassium thiocyanate, etc. Such crystallization-impeding additives may be added to the paint in an amount of up to 5% by weight of paint.

In order to improve the long-term stability of the paint with respect to microbial spoilage, the paint may further contain any of the fungicides and bactericides conventionally used in the paint industry for addition to paint. Examples of such preservatives are organotin derivatives, organomercury derivatives, adamantan derivatives, barium metaborate, heterocyclic carbamates, etc.

The paint of the invention may be prepared by mixing together the constituents. For example, the paint may be prepared by adding the fillers and/or pigments to an aqueous solution of the salt/salts in question in an appropiate concentration, followed by adding the optional binders and/or additives to the obtained mixture.

The paint of the invention may be applied by any of the application methods conventionally used in the paint industry such as spraying, brushing, rolling, padding, etc.

The invention is illustrated by the following examples which, however, are not construed to be limiting.

EXAMPLE 1

| Ingredients | |
|---|---|
| Chalk (Mikrostevns 5 slemmekridt, Faxe Kalkbrud, Denmark; specific surface area (DIN 66132): 2.2 m$^2$/g; particle size (50%): 3.5 μm; oil absorption 22 g/100 g) | 3 kg |
| Dolomite (Microdol 1, Norwegian Talc A/S, Norway; particle size (50%): 7.5 μm; oil absorption 15–16 g/100 g) | 1 kg |
| TiO$_2$ (Tiofine ® R 50, Tiofine B.V., Holland; oil absorption: 28 g/100 g) | 1 kg |
| Saturated Na$_2$S$_2$O$_3$ solution (made from the pentahydrate) | 2.5 l |
| Saccharose | 20 g |
| Silicone oil (200–350 CS, Dow Corning, USA) | 5 g |

Chalk, dolomite and TiO$_2$ were added to the saturated Na$_2$S$_2$O$_3$ solution and mixed thoroughly. Thereafter, saccharose and silicone oil were added to the mixture giving approximately 5 liters of paint.

The paint was applied to cardboard (thickness 2 mm) by means of a brush, and was dry within 1 hour. The dried paint exhibited good covering characteristics and was stable (i.e. it did not lose contact with the cardboard) at normal humidities.

EXAMPLE 2

The procedure of Example 1 was repeated with the exception that instead of using saturated Na$_2$S$_2$O$_3$ solution, a solution containing Na$_2$S$_2$O$_3$ and NaCl was used. This solution was prepared by adding saturated NaCl solution to a saturated Na$_2$S$_2$O$_3$ solution until the density of the resulting solution was 1.30 g/cm$^3$. To obtain this density, the two saturated solutions were mixed in a ratio of approximately 1:1.

The paint was tested as described in Example 1 and exhibited good covering characteristics and was stable at normal humidity.

EXAMPLE 3

400 g Microdol 1 (Norwegian Talc A/S), 700 g Microdol Extra (Norwegian Talc A/S; particle size (50%): 2.5 μm; oil absorption: 18–19 g/100 g) and 500 g Tiofine ® R 50 (Tiofine B.V.) were mixed to form a homogeneous powder mixture. To 100 ml saturated NaCl solution was thereafter added a sufficient amount of the powder mixture to yield a total volume of 200 ml, followed by thorough mixing.

The paint was tested as described in Example 1 and exhibited good covering characteristics and was stable at normal humidity.

EXAMPLE 4

The procedure of Example 3 was repeated with the exception that instead of using saturated NaCl solution, a mixture of 1 volume part of saturated NaCl solution and 4 volume parts of saturated Na$_2$S$_2$O$_3$ solution was used.

When tested as described in Example 1, the dried paint was stable with respect to humidity but with a slight tendency to crystal formation on the surface.

EXAMPLE 5

The procedure of Example 4 was repeated with the exception that 5% (volume/volume) of a 10% by weight solution of potassium hexacyanoferrate was added.

When tested as described in Example 1, the dried paint was stable with respect to humidity and without crystal formation on the surface.

EXAMPLE 6

A piece of coarse cardboard with a thickness of 1 mm was impregnated on the surface with a 3% aqueous solution of a blue dye (Acilan echt-blau RBX from Bayer, Leverkusen, West Germany), and the solution was allowed to dry. The paint according to Example 3 was applied to the surface of one half of the cardboard, and a conventional matte water-based plastic emulsion paint (Paint 777 from Beck & Jørgensen A/S, Copenhagen, Denmark) was applied to the other half.

After 0.5–2 minutes, the blue dye started seeping through the conventional emulsion paint as the dyestuff penetrated the paint layer during the evaporation phase. No seepage of dyestuff was visible on the paint according to the invention.

A piece of each of the cardboard halves were cast into an epoxy resin (Araldit ® for microtome use, from Ciba-Geigy AG, Switzerland), and were sectioned in a microtome. The section of the paint layer was examined in a surface microscope. The sample with the paint according to the invention exhibited a sharp division between the blue dyestuff and the white paint, whereas the sample with the conventional waterbased paint exhibited a homogeneous colouring through out the paint layer and a somewhat fuzzy division between the paint layer and the dyestuff layer.

EXAMPLE 7

A paint base (in the following designated TMK) was prepared from the following ingredients:

| | |
|---|---|
| Saturated $ZnSO_4$-solution | 1400 g |
| Kaolin (grade C, English China Clay Ltd., UK; particle size: 3 μm; oil absorption 38 g/100 g) | 600 g |
| Mica (Micro-mica W1, Norwegian Talc A/S, Norway; particle size (50%): 1.2 μm; oil absorption: 52–53 g/(100 g) | 200 g |
| $TiO_2$ (Tiofine ® R 60, Tiofine B.V., Holland; oil absorption: 19 g/100 g; $TiO_2$-content: 95%) | 400 g |

Kaolin, mica and $TiO_2$ were added to the saturated $ZnSO_4$ solution and mixed thoroughly.

A paint was prepared from the following ingredients:

| | |
|---|---|
| TMK | 100 g |
| Sucrose | 5 g |
| Perlite (Perlite Type 300, Nordisk Perlite, Copenhagen; particle size ca. 1 μm) | 5 g |

The ingredients were mixed thoroughly. The paint was applied to plasterboard by means of a brush. The dried paint was almost completely matte and exhibited good covering power and was stable (i.e. it did not lose contact with the cardboard) at relative humidities up to 86%.

EXAMPLE 8

A paint was prepared from the following ingredients:

| | |
|---|---|
| TMK | 100 g |
| Sucrose | 5 g |
| Breox ™ 550 (polyethylenglycol blend from BP Chemicals Ltd., UK) | 5 g |

The ingredients were mixed thoroughly. The paint was applied to plasterboard by means of a brush. The dried paint was completely matte and exhibited good covering power and was stable at up to 86% relative humidity.

EXAMPLE 9

A mixture of 500 g water, 25 g sucrose and 25 g gum arabic was filtered. 480 g $ZnSO_4.7H_2O$ was dissolved in 300 g of the filtrate, and further 50 g $ZnSO_4.7H_2O$ was added as precipitate. The resulting mixture was designated mixture A.

A paint was prepared from the following ingredients:

| | |
|---|---|
| Mixture A | 63 g |
| Kaolin (grade C, English China Clay, Ltd. U.K.) | 23 g |
| $TiO_2$ (Tiofine ® R 60, Tiofine B.V., Holland) | 15.3 g |
| Mica (Micromica W1, Norwegian Talc A/S, Norway | 4 g |

The ingredients were mixed thoroughly. The paint was applied to plasterboard by means of a brush, and the dried paint was completely matte, had good covering power and was stable at relative humidities up to 86%.

EXAMPLE 10

A paint was prepared from the following ingredients:

| | |
|---|---|
| Saturated $Na_2S_2O_3$ solution (made from the pentahydrate) | 657 g |
| Chalk (Mikrostevns 5 slemmekridt, Faxe Kalkbrud, Denmark; specific surface area (DIN 66132): 2.2 m$^2$/g; particle size (50%): 3.5 μm; oil absorption 22 g/100 g) | 600 g |
| Dolomite (Microdol 1, Norwegian Talc A/S, Norway; particle size (50%): 7.5 μm; oil absorption 15–16 g/100 g) 200 g | |
| $TiO_2$ (Tiofine ® R 60, Tiofine B.V., Holland) | 100 g |
| Sucrose | 83 g |
| Dextrin | 83 g |

Chalk, dolomite and $TiO_2$ were added to the saturated $Na_2S_2O_3$ solution and mixed thoroughly. Thereafter, saccharose and dextrin were added to the mixture.

The paint was applied to plasterboard by means of a brush and gave a useful matte film after drying.

EXAMPLE 11

A paint was prepared from the following ingredients:

| | |
|---|---|
| Saturated $MgSO_4$ solution | 644 g |
| Chalk (Mikrostevns 5 slemmekridt, Faxe Kalkbrud, Denmark; specific surface area (DIN 66132): 2.2 m$^2$/g; particle size (50%): 3.5 μm; oil absorption 22 g/100 g) | 585.6 g |
| Dolomite (Microdol 1, Norwegian Talc A/S, Norway; particle size (50%): 7.5 μm; oil absorption 15–16 g/100 g) | 195.2 g |
| $TiO_2$ (Tiofine ® R 60, Tiofine B.V., Holland) | 195.2 g |
| Hectorite (Montmorillonite thickener; Georg M. Langer & Co GmbH, West Germany) | 21.3 g |

Chalk, dolomite, TiO$_2$ and hectorite were added to the saturated MgSO$_4$ solution and mixed thoroughly.

The paint was tested as described in Example 1 and was matte, exhibited good covering characteristics and was stable at normal humidity.

EXAMPLE 12

A paint base was prepared from the following ingredients:

| Water | 9.29 kg |
|---|---|
| Zinc sulphate | 9.78 kg |
| Sucrose | 2.93 kg |
| Gum arabic | 489 g |

The ingredients were mixed and stirred until a homogeneous solution was obtained.

The paint base was then mixed with the following ingredients:

| TiO$_2$ (Tiofine ® R 60, Tiofine B.V., Holland) | 9 kg |
|---|---|
| Kaolin (grade C, English China Clay Limited, UK) | 15 kg |

The TiO$_2$ and the kaolin were added to the paint base and mixed thoroughly. The mixture was then heated to 65° C., and 2.43 kg of a 3:1 mixture of paraffin (melting point 60° C., Dansk Voksfabrik A/S, Copenhagen, Denmark) and cetyl alcohol (Hyfatol 60, Århus Oliefabrik A/S, Århus, Denmark) heated to 60° C. was added, and the mixture was stirred thoroughly in order to disperse the paraffin/cetyl alcohol mixture.

The paint was almost completely matte when painted on glass plates. When applied by means of a brush to walls with brownish discolourings (probably containing iron salts) no seepage of stains was observed. A conventional matt water-based plastic emulsion paint (Paint 777 from Beck & Jørgensen A/S, Copenhagen, Denmark) became discoloured through seepage of the stains.

EXAMPLE 13

Various paints were tested according to a method employed by the Technological Institute of Copenhagen for the testing of seepage. The test was as follows:

A slab of eternite plate was covered with a lignin sulphonate-containing plaster filler ("Sulfitspartelmasse" from A/S Sadofoss, Hillerød, Denmark) which has a brown colour. The paints prepared in Examples 7, 8 and 9 were applied to the dried filler by means of a brush. The dried paint samples were then tested in an atmosphere with a relative humidity of 86%. No seepage of the brown colour was observed.

I claim:

1. A water-based pigmented paint exhibiting the property of substantially preventing dissolution of water-soluble organic or inorganic colored substances present on a surface to which said paint is applied, said paint composition comprising:
   a pigment, said pigment being present in said paint composition in an amount of on the order of at least about 5% by weight;
   a filler, said filler being present in said paint composition on the order of from about 20 to about 70% by weight, based on the weight of said composition; and
   an aqueous phase containing a water-soluble salt, or a mixture of water-soluble salts, in an amount of at least about 10% (weight/volume) of said aqueous phase.

2. A water-based paint as claimed in claim 1 in which the water-soluble salt comprises:
   (a) a cation selected from lithium, sodium, potassium, magnesium, calcium, aluminium, zinc, ferro and ammonium ions; and
   (b) an anion selected from sulphate, hydrogen sulphite, hydrogen sulphite, thiosulphate, hydrogen thiosulphate, halogen, phosphate, hydrogen phosphate, dihydrogen phosphate, nitrate, nitrite, carbonate, hydrogen carbonate, aluminate, thiocyanate and borate ion,s and ions of C$_{1-4}$ alkonoic acids optionally substituted with one or more hydroxy groups, C$_{2-4}$ dialkanoic acids optionally substituted with one or more hydroxy groups, citric acid, and benzoic acid and mixtures thereof.

3. A water-based paint as claimed in claim 2 in which said cation is selected from lithium, sodium, potassium, magnesium, zinc, aluminium and ammonium ions and said anion is selected from sulphate, thiosulphate chloride, bromide, iodide, and phosphae ions.

4. A water-based paint as claimed in claim 3 in which said cation is selected from sodium, potassium, magnesium, zinc and ammonium ions and said anion is selected from sulphate, thiosulphate and chloride ions.

5. A water-based paint as claimed in claim 4 wherein the the water-soluble salt is selected from the group consisting of sodium thiosulfate, potassium thiosulfate, ammonium thiosulfate, ammonium sullfate, sodium chloride, magnesium sulfate, zinc sulfate and potassium chloride.

6. A water-based pigmented paint composition exhibiting the property of substantially preventing dissolution of water-soluble organic or inorganic colored substances present on a surface to which said paint is applied, said paint composition consisting essentially of:
   a pigment, said pigment being present in said composition in an amount of on the order of at least about 5% by weight;
   a filler, said filler being present in said composition on the order of from about 20 to about 70% by weight of said composition;
   an aqueous phase containing a water-soluble salt, or a mixture of water-soluble salts, said salt present in said paint composition in an amount of at least 10% (weight/volume) of said aqueous phase;
   a binder, said binder present in said paint composition in an amount of from about 3 to about 20% by weight, based on the weight of said paint composition;
   reinforcing fiber, said fiber selected from the group consisting of glass, diabas, polyethylene, polypropylene, polyester, polyacrylonitrile and mixtures thereof, said fibers having a length of from about 2 to 10 mm and present in said paint composition in an amount of up to about 5% by weight;
   a hydrophobizing agent selected from the group consisting of silicone oil, silicone resin, fluorinated silicone, wax emulsions and polyethylene dispersions, said agent present in said paint composition in an amount of up to about 15% by weight;
   a viscosity-reducing agent selected from saccharides, polysaccharides and polyhydric alcohols, said agent present in said paint composition in an amount of from about 1 to about 20% by weight;

surfactant selected from lecithin, alkyl sulfates, alkyl sulfonates and polyoxyethylene derivatives, said surfactant present in said paint composition in an amount of up to about 2% by weight;

an anti-foaming agent selected from silicone and fatty alcohols, said agent present in said paint composition in an amount of up to about 0.5% by weight; and a crystal formation-retarding agent selected from potassium hexacyanoferrate, potassium ferricyanide, potassium cyanate and potassium thiocyanate, said agent present in said paint composition in an amount of up to about 5% by weight.

7. A paint composition as defined by claim 1 further including a binder present in an amount of from about 3 to about 20% by weight, based on the weight of said paint composition.

8. A paint composition as claimed in claim 1 wherein the concentration of said salt is at least about 25% (weight/volume) of said aqueous phase.

9. A paint composition as claimed in claim 1 wherein the concentration of said salt is at least about 35% (weight/volume) of said aqueous phase.

10. A paint composition as claimed in claim 1 wherein the concentration of said salt is at least about 50% (weight/volume) of said aqueous phase.

11. A paint composition as claimed in claim 1 wherein the concentration of said salt is at least about 70% (weight/volume) of said aqueous phase.

12. A water-based paint as claimed in claim 1 which further contains a compound selected from the group consisting of saccharides, polysaccharides, and polyhydric alcohols, said compound present in said paint composition in an amount of from about 1 to about 20% by weight.

13. An aqueous paint composition as claimed in claim 1 wherein said salt is zinc sulfate.

14. A paint composition as defined by claim 7 wherein said binder is a water-soluble binder selected from the group consisting of cellulose derivatives, polyacrylates, carboxyvinyl polymers, polyethelene glycol, polyethylene oxide, polyvinyl alcohol, polyvinyl methyl ether, polyvinyl pyrrolidone, gums arabic, karaya, tragacanth, guar, locust bean, tamarind, xanthan and ghatti, starch, agar-agar, alginate, Irish moss, casein, gelatin, alkali metal silicates, and mixtures thereof.

* * * * *